G. F. BOTSCHEIDER.
AUTOMATIC LOCKING DEVICE FOR PNEUMATIC TUBE SYSTEMS.
APPLICATION FILED JUNE 7, 1919.
1,339,594.
Patented May 11, 1920.
5 SHEETS—SHEET 1.
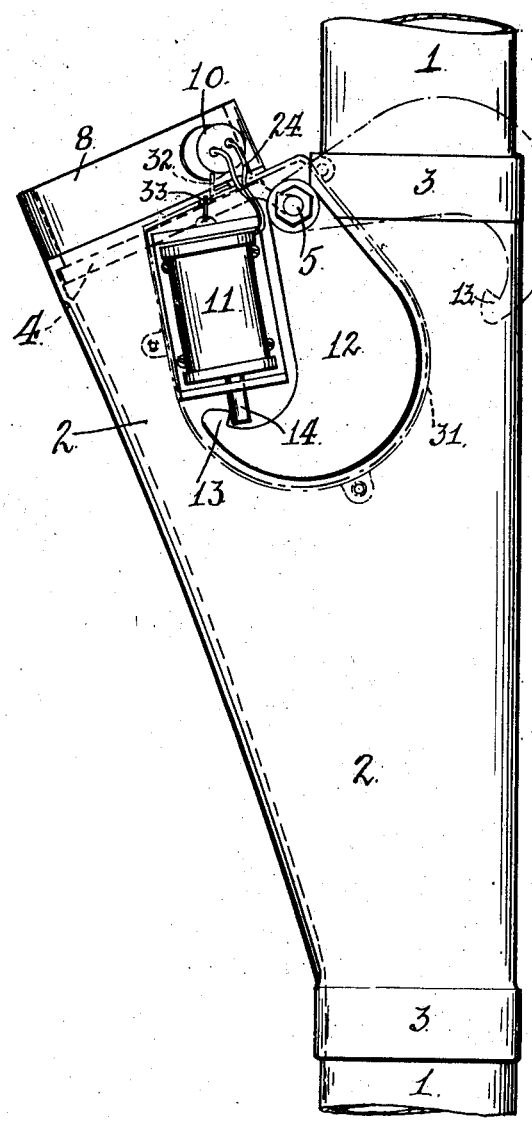
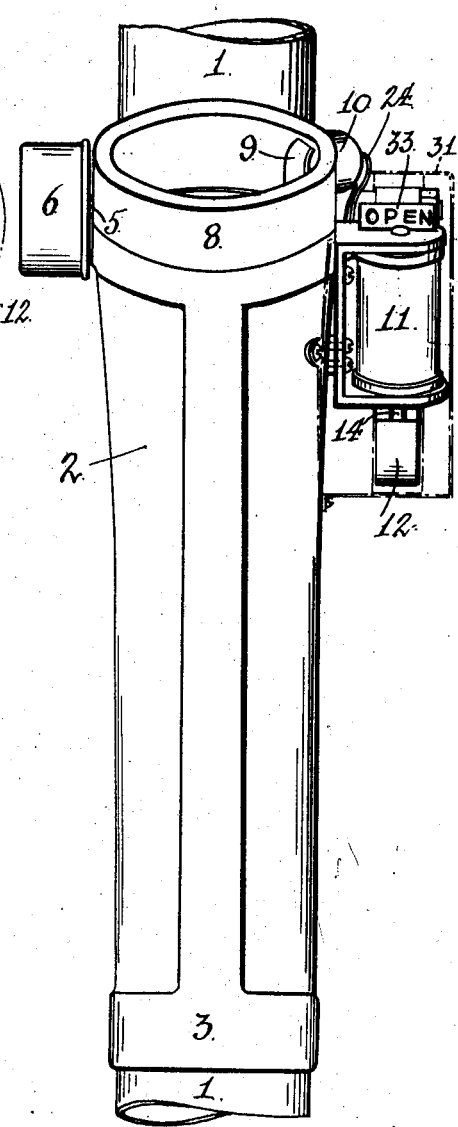

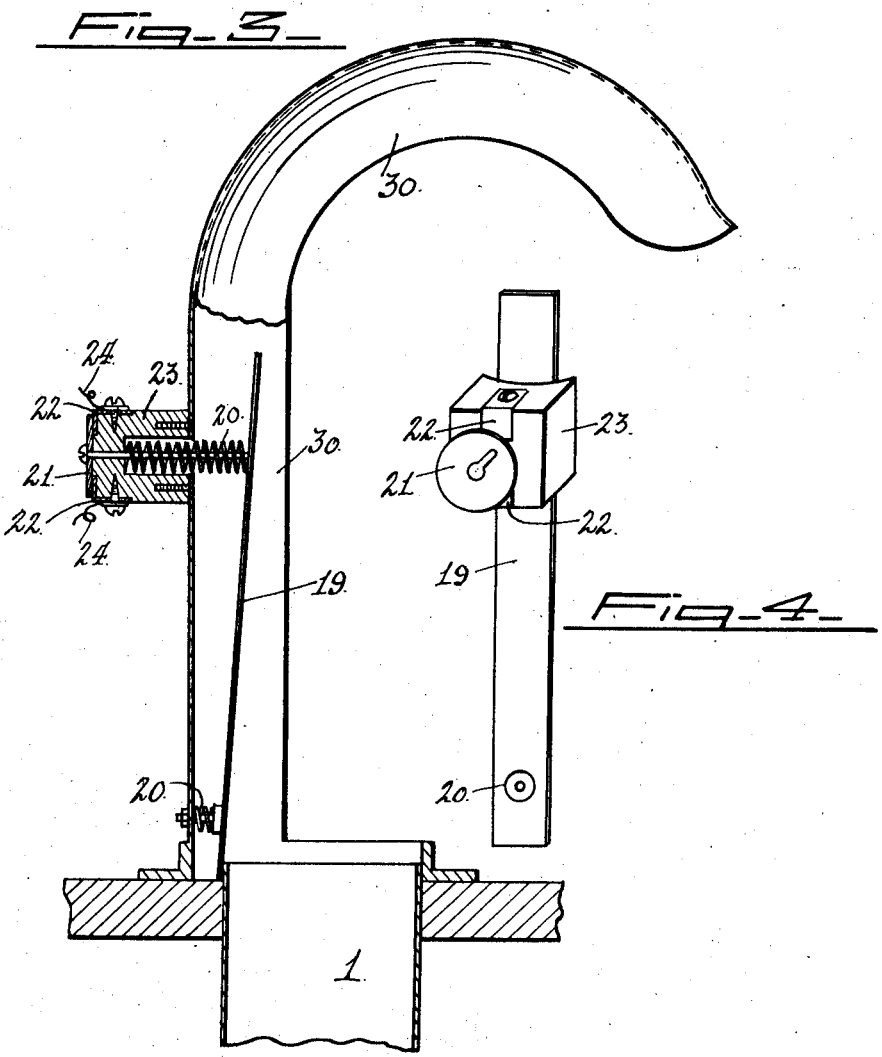

G. F. BOTSCHEIDER.
AUTOMATIC LOCKING DEVICE FOR PNEUMATIC TUBE SYSTEMS.
APPLICATION FILED JUNE 7, 1919.
1,339,594.
Patented May 11, 1920.
5 SHEETS—SHEET 3.
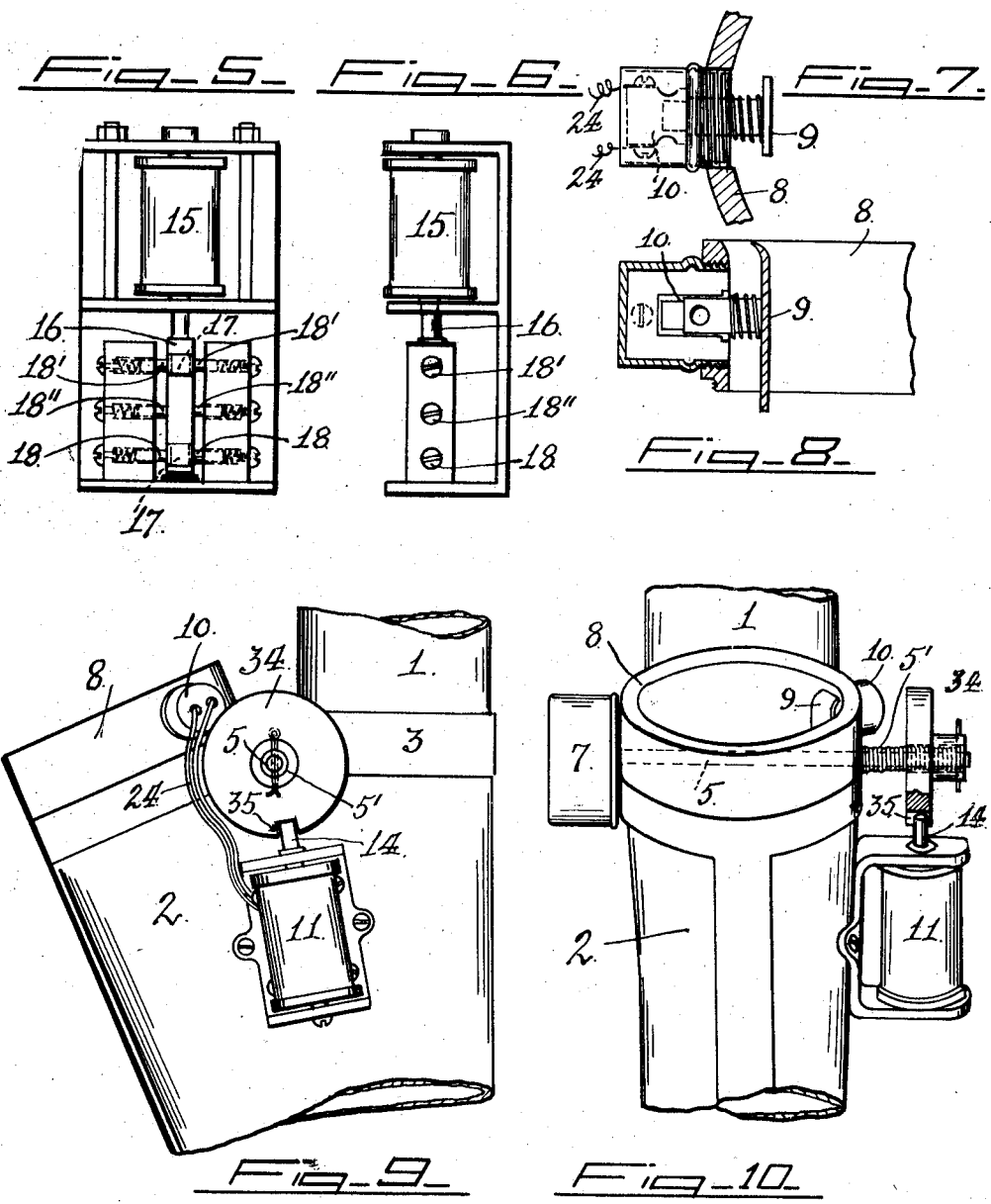

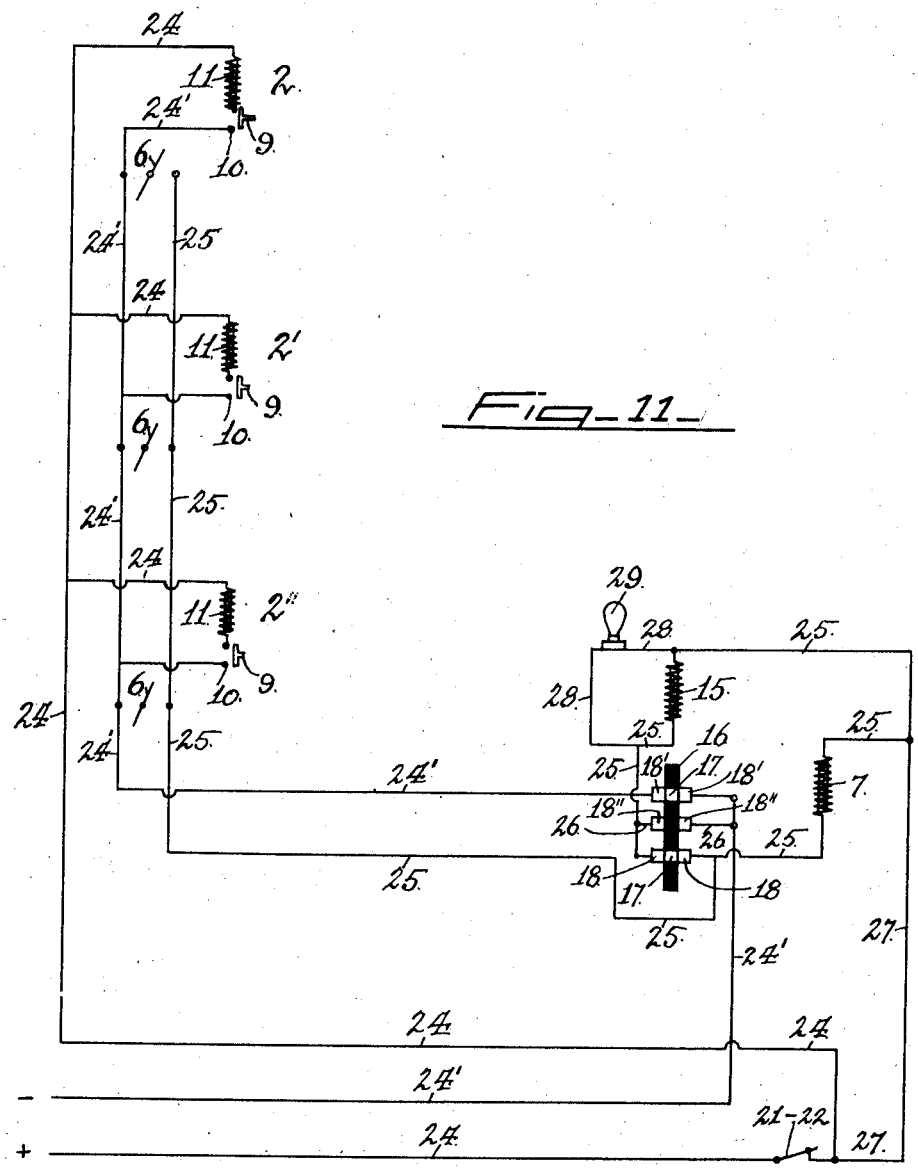

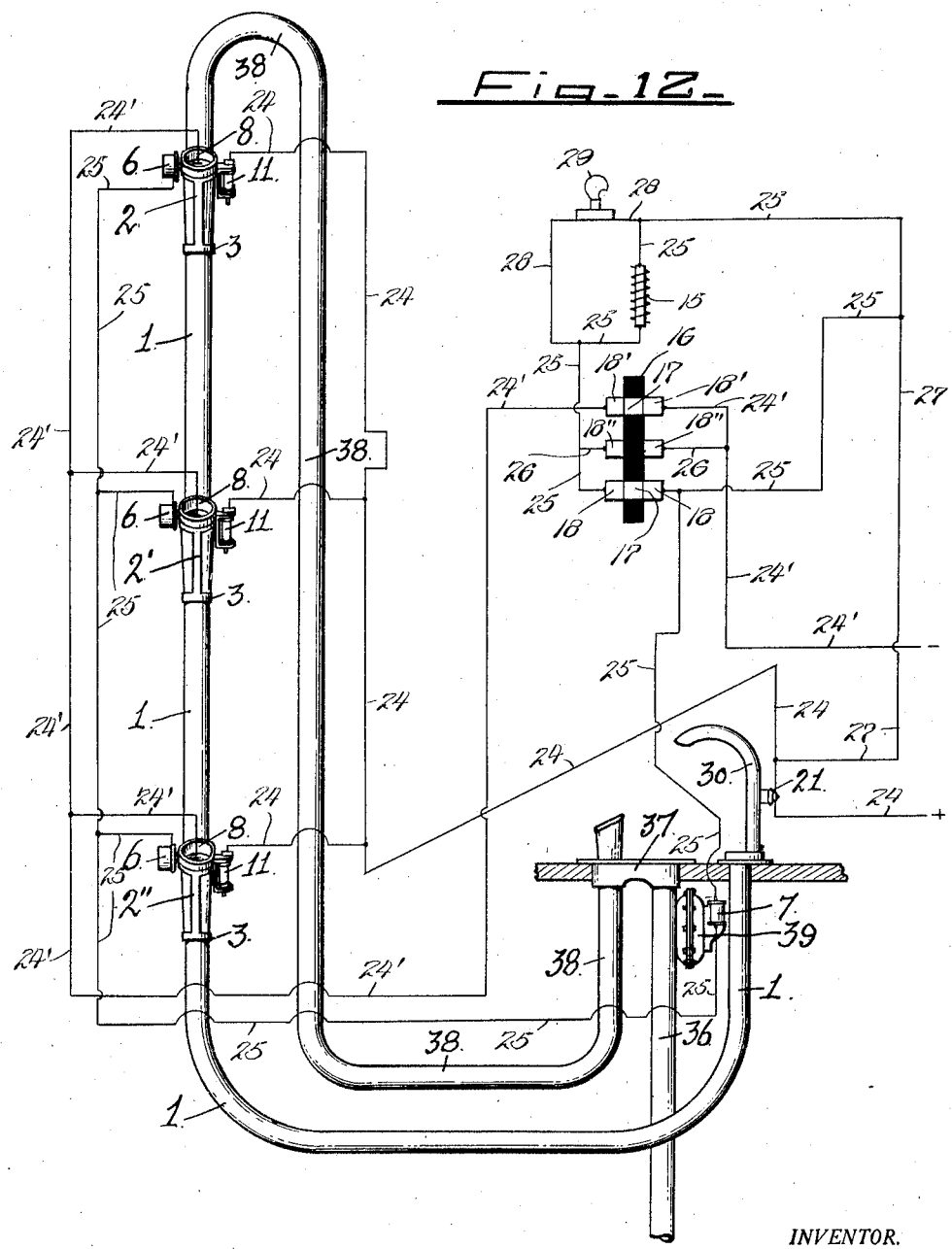

UNITED STATES PATENT OFFICE.

GEORGE F. BOTSCHEIDER, OF SAN FRANCISCO, CALIFORNIA.

AUTOMATIC LOCKING DEVICE FOR PNEUMATIC-TUBE SYSTEMS.

1,339,594.  Specification of Letters Patent.  Patented May 11, 1920.

Application filed June 7, 1919. Serial No. 302,558.

*To all whom it may concern:*

Be it known that I, GEORGE F. BOTSCHEIDER, a citizen of the United States, residing in the city and county of San Francisco, and State of California, have invented certain new and useful Improvements in Automatic Locking Devices for Pneumatic-Tube Systems, of which the following is a specification.

My invention relates to pneumatic-tube systems, and is applicable to a system embodying a one pipe or common sender to the central or distributing station, with one end and intermediate stations.

In systems of this type now in use, there are certain disadvantages which may briefly be stated to include first, the possibility of inserting any number of carriers at the same time from the several stations, resulting in interference in and choking of the system; second, the chance to insert the carriers too rapidly from any station; third, the carriers can be inserted after the machinery is stopped; fourth, carriers can be inserted at the same time that others are passing; and fifth, no warning is given to the operator at the central station when the system is choked or stopped.

It is the object of my invention to overcome these difficulties, and to this end my invention consists in the novel automatic locking and warning devices, which I shall now fully describe by reference to the accompanying drawings, in which—

Figure 1 is a side view of a section, broken, of the sender pipe, showing one Y or sending station.

Fig. 2 is a front view of the same.

Fig. 3 is a view of the receiver at the exchange.

Fig. 4 is a perspective of the switch in said receiver.

Fig. 5 is a front elevation of the holding magnet of the locking system.

Fig. 6 is a side elevation of the same.

Fig. 7 is a vertical section of the unlocking switch in the collar of the sending Y.

Fig. 8 is a horizontal section of the same.

Fig. 9 is a side elevation of a modification of the clapper-lock.

Fig. 10 is a front view of the same.

Fig. 11 is a view showing the wiring diagram.

Fig. 12 is an elevation of a pneumatic tube system to which my invention is applied.

Pneumatic-tube systems, both of the suction and of the blowing type are now so well known, that it will not be necessary for me to illustrate nor to describe in great detail their construction and operation, in order to convey a full understanding of my improvements as applied to them. Accordingly, I shall first now describe sufficient detail of a common form or system to understand its general operation, and shall thereafter describe my improvements.

In Figs. 1, 2 and 12, I show a pipe 1 which is the common sender pipe. Any number of stations for sending the carriers may be along this pipe. For illustration I have here shown in Fig. 12 three sending stations indicated by the Y 2, though it is understood that others may be on the same pipe, either above or below or both above and below.

The sending Y 2 is let into the pipe 1 at the couplings 3, and said Y is fitted with a lid, gate or valve 4, as in Fig. 1 commonly called a clapper which covers the mouth of the Y. The purpose of the clapper is to keep the air from escaping during operation. The clapper 4 is mounted for swinging movement, upon a shaft 5.

Upon the side of the Y, as seen in Figs. 2 and 12, is a snap-switch 6, which is operated to make and break contact, by the rocking of the shaft 5, due to the swinging of the clapper 4, as is common in pneumatic tube systems so that when the clapper is forced inwardly by the entrance of the carrier, the snap switch 6 makes contact and closes an electric circuit to the air-magnet 7 shown in the wiring diagram of Fig. 11 and in Fig. 12, whereupon the air is admitted to the pipe 1, to send the carrier on its way to the distributing station or exchange. Immediately the clapper closes again, due both to air pressure and a spring with which it is fitted, so that the snap switch 6 breaks contact and thus cuts off the air.

In Fig. 12 I have indicated the air supply pipe by 36. This communicates through the fitting 37 with the air pipe 38 of the system. In this Fig. 12, I have not deemed it necessary to show the details of an elaborate system, as these form no part of my invention. Accordingly, I indicate the air pipe 38 as joining the sender pipe 1. In like manner I indicate in Fig. 12, at 39 the casing of an air control device in practice, a diaphragm, which is operated electrically by the magnet 7.

Thus far the description is of a common system. My improvements begin at this point.

I fit the mouth of the Y 1 with a collar 8, to serve as a convenient bearing for a switch push-plate 9 on its inner surface, Figs. 2, 7 and 8, and lying in the way of the entering carrier, which, by its entrance, serves to push back the plate, to make contact with the other switch member 10 on the outside of the collar, and thus close an electric circuit to a magnet 11, Figs. 1 and 2, which I mount on one side of the Y. This magnet has the function of locking and unlocking the clapper 4. It may accomplish this function in several ways, as, for example, that shown in Fig. 1, or that shown in Figs. 9 and 10. The form shown in Fig. 1, comprises a weight 12 on the clapper shaft 5, so placed as to normally tend to close the clapper. The weight 12 is provided with a terminal hook 13, with which the armature core 14 of the magnet 11 normally engages when the magnet is deënergized; but when said magnet is energized, the core 14 lifts from the hook 13. It will thus be seen that when no current is passing through the magnet 11, the clapper 4 is positively locked and cannot be swung open by an entering carrier. But if current be present, then an entering carrier, acting on the push plate 9 will energize the magnet 11, which by lifting its core 14 will release the weight 12 and thus unlock the clapper, so that the carrier can pass in. After it passes, the circuit being open at the push plate switch, the clapper will return, and be locked again.

Each sending station is to be provided with this automatic locking device, and I propose upon the entrance of a carrier at any one receiving station to automatically cut out the electric current to all the stations on the same sending pipe, and to hold them so cut out, so that their locked clappers cannot be opened to receive a carrier, until the first carrier approaches the exchange, at which time said carrier will automatically restore the unlocking circuits to all the sending stations.

This operation requires two main structures, one a "holding" magnet, as I shall term it, and the other a "restoring" switch, as it may be termed.

A suitable form of the holding magnet, I show in Figs. 5 and 6. It comprises a magnet 15, with a core 16, the lower portion of which is of insulating material, such as fiber. This fiber portion carries contact plates or rings 17, separated by insulating space, and having insulating spaces beyond them. This fiber core operates between lower contacts 18, upper contacts 18' and middle contacts 18'', in a manner and with the effect best understood from the wiring diagram presently to be described.

The restoring switch is shown in Figs. 3 and 4. In the receiver pipe 30 at the exchange is a copper push plate 19, held by springs 20 to lie in the path of travel of the carrier, passing through said pipe to its discharge. This plate carries a contact disk 21 which is held normally against the contacts 22 carried by an insulating block 23 secured to the outside of pipe 30. These contacts 21 and 22 form a switch normally closed, but adapted to be opened by the movement of the push plate 19, due to a passing carrier.

Referring now to Fig. 11 for the wiring diagram, the sending stations, for illustration, are shown as three in number and designated by 2, 2' and 2''. At each station is the locking magnet 11, the push plate switch 9—10, and the air control snap switch 6.

The air magnet is shown at 7, the holding-magnet at 15 and its core at 16. The breaker switch at the exchange station is shown at 21—22.

24 is a circuit, the inleading wire of which passing through the normally closed breaker switch 21—22 at the exchange station, continues to each of the normally open locking magnets 11 and switches 9—10 at the sending stations 2, 2' and 2''; and thence the outleading wire 24' extends to and through the upper contacts 18' of the core 16 of the holding-magnet 15 and out again to source.

From this circuit 24 and 24', through the normally open snap-switch 6 at each sending station leads a circuit 25 to the air magnet 7, and thence through the holding magnet 15, and through the lower contacts 18 of the core 16 of said magnet.

A short circuit 26 leads from the circuit 25 through the middle contacts 18'' of the core 16 to the circuit wire 24'.

From the circuit 24, just beyond the breaker switch 21—22, leads a circuit 27 to the circuit 25. Finally, a branch 28 of circuit 25 includes a warning or pilot light 29 at the exchange station.

The operation is as follows:—When the system is in a normal condition, that is, not in use from any sending station, no current is flowing through any station because the main circuit is open at the locking switches 9—10, and the clapper 4 at each station is locked.

If now a carrier be introduced to the Y of the sending tube 1 at station 2, said carrier, by contact with the push plate 9, closes the circuit 24 to the locking magnet 11 of said station and said magnet being energized at once withdraws its core 14 from the hook 13 of the weight 12, thereby unlocking the clapper 4 of said station. The entering carrier now swings the clapper in passing it, and this movement of the clapper through its rocking shaft 5 closes the snap switch 6 which thus closes the circuit 25 to the air-control magnet 7, with the usual effect in this type of pneumatic-tube systems of admitting the air to the tube, to advance the carrier through the system to the exchange. The closing of circuit 25 at the same time energizes the holding magnet 15, which draws up its core 16, with the effect of breaking the upper and lower contacts 18 and 18′ but throwing into circuit the middle contacts 18″. This has the effect of keeping the holding magnet energized through branch circuit 26, so that said core 16 is still held up, but the locking or main circuit 24′ is broken at 18′ and the air magnet circuit 25 is also broken at 18, so that all the locking magnets 11 of circuit 24 are deënergized, and their cores 14 drop back to lock the clappers; and also the air-magnet 7 is deënergized to cut off the air. It will now be seen that as long as this first carrier is in the sending tube 1, this condition continues, with the effect that during this time all the station clappers are locked and can not be unlocked, because there is no current through the switches 9—10 and magnets 11. Therefore, no other carrier can be introduced to tube 1 while a previous carrier is on its way. When, however, the carrier reaches the delivery tube 30 at the exchange, it will by contact with push plate 19 open the switch 21—22, thereby momentarily cutting out the incoming current, with the effect of deënergizing the holding magnet 15, so that it drops its core 16 and thereupon the system is restored to its first condition, ready to receive another carrier, at any station.

By means of the circuit 28, the pilot light 29 gives warning of the presence and travel of a carrier in the tube 1 lighting up the moment the carrier is deposited and remaining lighted until the carrier has reached the exchange. Therefore if this light should burn continuously it informs the operator that the tube line is out of order.

In order to give visual advice as to whether the clapper is locked or unlocked, I carry on the housing 31, which contains the locking magnet 11, a sign plate as shown at 32 in Fig. 1, on which I mark "Locked" and on the top of the magnet core 14 I place another sign plate 33, "Open," which when the core is lifted is adapted to be projected from the housing and to appear in front of and cover the sign plate "Locked," as seen in Fig. 2.

The specific form of clapper lock, shown in Fig. 1, and heretofore described, is not an essential detail, as this lock may be modified in various ways, as, for example, in the detail shown in Figs. 9 and 10, wherein the clapper shaft 5 has a controlling spring 5′ and carries a disk 34 with a notch 35, with which the core 14 of the locking magnet 11 makes and breaks engagement.

In the operation of the system as improved by my invention, it is evident that the operator at the exchange can control the entire system to lock and unlock it, and that all stations are locked when the machinery is stopped. This prevents clerks from sending carriers after and between hours of operation of the machinery that furnishes the air.

It is also evident that my improvements are equally applicable to either the vacuum or pressure tube system.

I claim:—

1. In a pneumatic-tube system the combination of a sending tube having a plurality of station Y's, a normally closed swinging clapper in each station Y, a switch carried by each station Y controlled by the movement of said clapper; an electric circuit controlled by said switch; a magnet in said circuit for controlling the air pressure to the system, and a delivery tube at an exchange station, an electromagnet at each Y-station, having a core; means actuated by said core to lock and unlock the clapper of that station; a normally open switch disposed in the mouth of each Y station adapted to be closed by the contact of an entering carrier; an electric circuit including said magnets and switches, whereby upon the entrance of a carrier the clapper is unlocked to permit the passage of the carrier into the system; a holding magnet and its core in said electric circuit for cutting out the current to said locking magnets whereby the clappers at all Y-stations are locked and held locked during the travel of the carrier; and a normally closed switch in the delivery tube adapted by the passage of the carrier therethrough for restoring said current to the locking switches and magnets.

2. In a pneumatic-tube system the combination of a sending tube having a plurality of station Y's, a normally closed swinging clapper in each station Y, a switch carried by each station Y controlled by the movement of said clapper; an electric circuit controlled by said switch, a magnet in said circuit for controlling the air pressure to the system, and a delivery tube at an exchange station, an electromagnet at each Y-station, having a core; means actuated by said core to lock and unlock the clapper of that station; a normally open switch disposed in the mouth of each Y station adapted to be closed by the contact of an entering carrier; an electric circuit including said magnets and switches, whereby upon the entrance of a carrier the clapper is unlocked to permit the passage of the carrier into the system; a holding magnet and its core in said electric circuit for cutting out the current to said locking magnets whereby the clappers at all Y-stations are locked and held locked during the travel of the carrier; a normally closed switch in the delivery tube adapted by the passage of the carrier therethrough for restoring said current to the locking switches and magnets; and a warning lamp at the exchange station for indicating the presence of the carrier in the system.

In testimony whereof I have signed my name to this specification in the presence of two subscribing witnesses.

GEORGE F. BOTSCHEIDER.

Witnesses:
 WM. F. BOOTH,
 D. B. RICHARDS.